United States Patent [19]

Foote et al.

[11] Patent Number: 4,956,735

[45] Date of Patent: Sep. 11, 1990

[54] ACTUATOR MAGNETIC CIRCUIT

[75] Inventors: Wayne E. Foote, Eagle; Richard L. Swantner, Meridian, both of Id.

[73] Assignee: Hewlett-Packard Company, Palo Alto, Calif.

[21] Appl. No.: 349,469

[22] Filed: May 8, 1989

[51] Int. Cl.⁵ ............................................. G11B 21/08
[52] U.S. Cl. ...................................... 360/106; 310/13
[58] Field of Search ........................... 360/106; 310/13

[56] References Cited

U.S. PATENT DOCUMENTS

| 3,505,544 | 4/1970 | Helms | 310/13 |
| 4,414,594 | 11/1983 | Farmer | 360/106 |
| 4,607,913 | 8/1986 | Jansen | |

OTHER PUBLICATIONS

Yamamoto, T., "Development of High Performance Head Positioner for an Optical Disk Storage System", S.P.I.E., vol. 695, Optical Mass Data Storage (1986), pp. 153–159.

*Primary Examiner*—A. J. Heinz

[57] ABSTRACT

A magnetic circuit structure for use in an actuator, where the actuator has a displaceable assembly and a coil attached to such assembly, is shown to include flux conductors having generally parallel first and second poles defining gaps therebetween and an integrally formed base joining one end of the first and second poles so that the conductor defines a continuous flux path, and magnets attached to each of the first poles in the gaps so that flux from the magnets is directed across the gaps, wherein a portion of the coil passes through said gap, so that when a current is passed through the coil, the assembly moves.

2 Claims, 2 Drawing Sheets

ACTUATOR MAGNETIC CIRCUIT

FIELD OF THE INVENTION

The present invention relates to the field of transducer positioning actuators in particular to the magnetic circuits utilized in such actuators and more particularly to the structure of such magnetic circuits.

BACKGROUND OF THE INVENTION

Information storage systems, particularly computer memory systems, typically store data magnetically or optically onto several types of media, such as rotating disks. Data stored on such disks, whether magnetic or optical, is contained within a series of tracks. Once formed on a disk, such tracks are generally concentric shaped and can number from approximately 77 to several thousand tracks, depending on the diameter of the disk utilized and whether the information is recorded magnetically or optically. The tracks on a disk can be viewed as roughly analogous to grooves on a phonograph record.

In magnetic recording and magneto-optical recording, information is stored on a subject media by orienting the magnetic field of the media at given points along given tracks. In order to access or read data stored on a disk, a so-called head or transducer is moved along a generally radial path across the surface of the disk as the disk is spinning. The generally radial movement will either follow a straight line path or an arcuate path, depending on whether a linear or rotary actuator is used for positioning the head.

Generally, actuators of the type described above affect movement of the transducer through a realization of the principle that if current is passed in a first direction through a conductor, which conductor is positioned in a magnetic field having a second direction, a force will be generated acting on the conductor in a third direction. This principle has been known as the right-hand rule. In such devices a sliding or rotating carrier is provided with a coil. A portion of the coil passes through a magnetic field. As current is applied in one direction or another through the coil, the carrier will move in a corresponding direction.

An illustration of this principle can be found in U.S. Pat. No. 4,607,913, issued to Jansen, wherein a linear actuator is described for moving a lens system along a radial path with respect to an optical disk. The patent discloses a box-like frame having independent upstanding walls defining a generally rectangular opening. Permanent magnets are shown to be attached to walls on opposite sides of the opening and a pair of guide rods are attached which pass between the magnets. An axially slidable carrier is shown mounted on the guide rods. A magnetic field created by this device included flux directed from the permanent magnet to the guide rod where upon it was conducted to the frame and back to the permanent magnet. A coil mounted on the carrier included a portion which passed through this magnetic field. By passing current through the coil, the carrier was said to move axially along the guide rods.

Another example of such an actuator was described in Yamamoto, T., "Development Of High Performance Head Positioner For An Optical Disk Storage System", S.P.I.E. Vol. 695, Optical Mass Data Storage II (1986) pages 153-159. Yamamoto describes a linear actuator for moving an optical lens system along a radial path with respect to an optical disk. The positioner was said to consist of a carriage mounted in an axially slidable fashion on a linear guide system which included two generally parallel guide rails. A single voice coil motor mounted to the carriage extends a distance on either side of the carriage and guide rail arrangement creating a large loop. Positioned on either side of the carrier and encompassing a portion of the voice coil were magnetic circuits. The magnetic circuits included structure similar to that shown in FIG. 1 wherein two flux conductors 10 and 12 are shaped to define a linear gap 14 therebetween. A permanent magnet 16 is attached to flux conductor 10 and extends partially across the width of gap 14 and extends substantially along the length of gap 14. Magnetic circuit structure similar to that shown in FIG. 1 was provided to both sides of the positioner described in Yamamoto. The voice coil passed through gap 14 in each structure. Consequently, when a current was passed through the voice coil, a force was applied to the coil which resulted in movement of the carriage along the linear guide system.

The problem with both Yamamoto and Jansen lies in the inefficiency of the magnetic circuit. Referring to FIG. 1, it will be understood that flux generated by magnet 16 will be directed across gap 14 to conductor 12 whereupon the flux will be conducted through conductor 10 and back to magnet 16. The magnetic field orientation of magnet 16 will determine the direction of flux across gap 14. In such a circuit, flux density is greatest at the contacting surfaces between conductor 10 and conductor 12. These surfaces by necessity create a small air gap, which will be dependent upon the preciseness by which the surface is machined. Consequently, the flux density in gap 14 and thus the efficiency of the actuator is affected by the care by which these components are made. Moreover, since magnet 16 is attached to conductor 10 during an assembly operation, large attractive forces will exist between conductor 10 and conductor 12 making assembly of the structure difficult. The combination of large attractive forces and precisely machined parts adds the possibility of worker injury during assembly.

However, a break in the structure of the flux conductor is necessary in order to economically construct the actuator. If the flux conductor were continuous throughout, i.e., conductors 10 and 12 were to be integrally formed, the coil could only be assembled so that a portion passed through gap 14 by winding the coil through the gap during coil assembly. Such a manufacturing operation is both cumbersome and uneconomical.

Consequently, a need exists in the art for magnetic circuit structure which both maximizes efficiency and provides for ease of assembly when used in an actuator device.

SUMMARY OF THE INVENTION

The advantages of the invention are achieved in a method and apparatus for a magnetic circuit structure used in an actuator where the actuator is provided with a displaceable assembly and a coil attached to such assembly wherein flux conductors having generally parallel first and second poles defining gaps therebetween and an integrally formed base joining one end of the first and second poles so that the conductor defines a continuous flux path, and magnets attached to each of the first poles in the gaps so that flux from the magnets is directed across the gaps, wherein a portion of the coil passes through said gap, so that when a current is passed through the coil, the assembly moves.

BRIEF DESCRIPTION OF THE DRAWINGS

The present invention will be better understood, and its numerous objects and advantages will become apparent to those skilled in the art by reference to the following detailed description of the invention when taken in conjunction with following drawings, in which.

DETAILED DESCRIPTION OF THE PREFERRED EMBODIMENT

Figure 1:
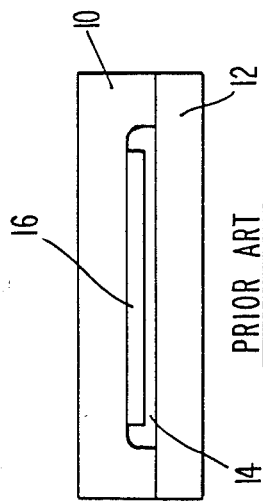
FIG. 1 is an end view of a prior art magnetic circuit structure.
Figure 2:
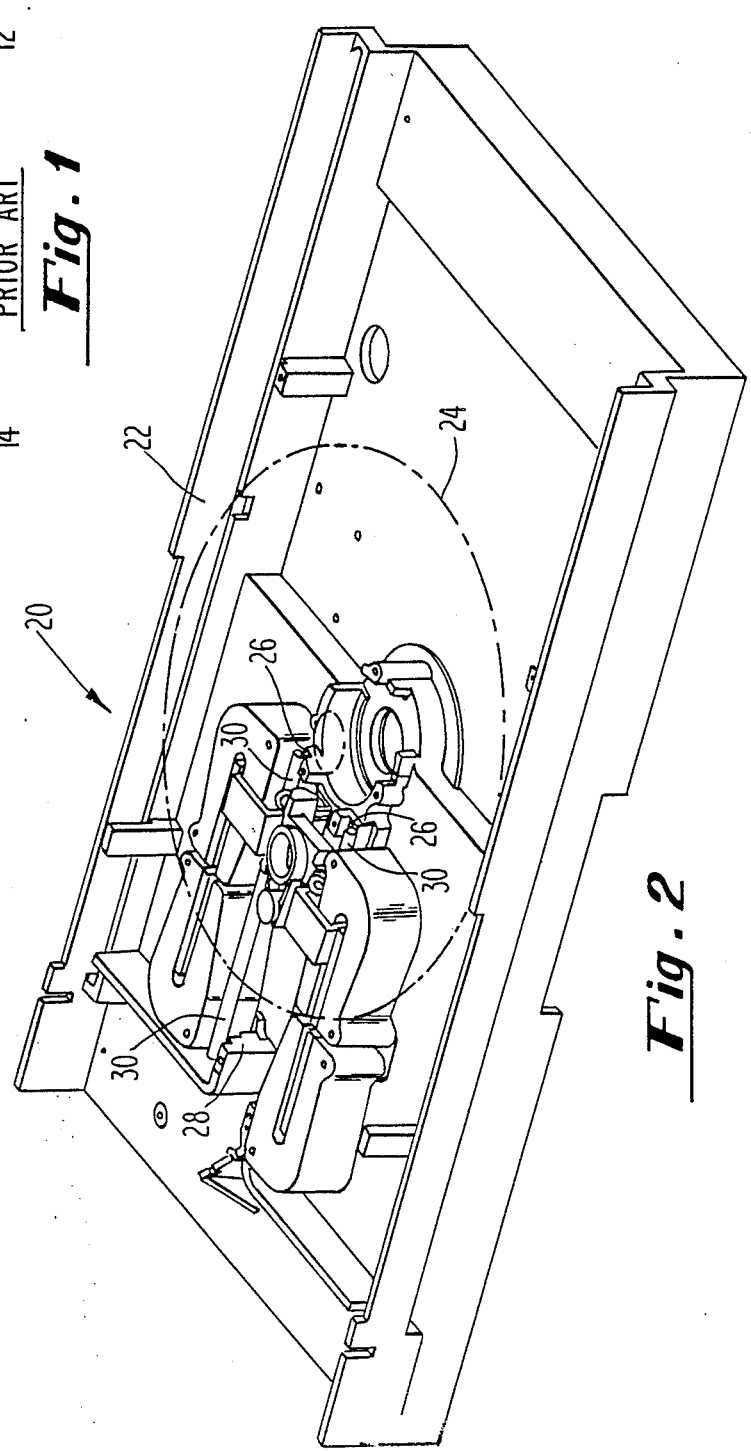
FIG. 2 is a perspective view of a portion of a computer memory device incorporating the magnetic circuit structure of the present invention.

A new and novel magnetic circuit 18 for use in a linear actuator 20 constructed in accordance with the principles of the present invention is shown in FIG. 2. Actuator 20 is shown to include a frame 22 to which the components to be described herein are attached. When fully assembled, actuator 20 is capable of having a disk 24 inserted therein for various read/write operations. Although the present invention is shown in relation to a linear actuator, the applicability of the present invention in relation to other types of actuators will be recognized upon review of the following disclosure. Additionally, it will be noted that the components of actuator 20 not shown in FIG. 2 can be of any known design.

Frame 22 is shown to have a number of upstanding shoulder portions 26 and 28. As shown in FIG. 2, a pair of rails 30 are attached between shoulder portions 26 and 28 in any known manner. Rails 30 are generally parallel and oriented in a radial direction with regard to disk 24. Although shown in FIG. 2, the description of the remaining elements of the preferred embodiment can be more easily seen in FIG. 3.

Carriage 32 is axially slidable along rails 30 by bearings 34. Bearings 34 can be of any known design and construction. It will be recognized that an objective in the design of bearings 34 is to provide as little friction as possible between carriage 32 and rails 30 during movement. A pair of coils 36 and 38 are attached to opposite sides of carriage 32 and generally extend in directions which are perpendicular to the movement of the carriage. It will also be understood that in the design of coils for use in actuators, a square or rectangular shape is preferred, since such a shape facilitates the orientation of the coil in and perpendicular to a magnetic field. It will also be understood that coil designs of other shapes can be utilized. For example, U.S. Pat. No. 4,607,913, Jansen discloses the use of cylindrically shaped coils.

Two sets 40 and 42 of magnetic circuits are shown to be disposed on either side of carriage 32. Set 40 is shown to include flux conductors 44 and 46. Conductor 44 includes poles 48 and 50 which define a gap 52 therebetween. Similarly, conductor 46 is shown to include poles 54 and 56 defining a gap 58 therebetween. Gaps 52 and 58 together form a linear gap in which coil 36 moves. Magnet 60 is attached to pole 48 in gap 52 by any suitable means. In the preferred embodiment, flux generated by magnet 60 passes across gap 52 through flux conductor 44 and back to magnet 60, defining a first magnetic circuit. Likewise, magnet 62 is attached to pole 54 in gap 58 so that flux generated by magnet 62 is directed across gap 58 and conducted by flux conductor 46 back to magnet 62, defining a second magnetic circuit. It will be recognized that while it is preferred that the flux generated by magnets 60 and 62 be directed across gaps 52 and 58, respectively, the actual direction of flux can be either away from or towards the magnets. It is only required that the direction of flux be identical and is preferred that the direction of flux be perpendicular to both coil 36 and the direction of movement of carriage 32.

Figure 3:
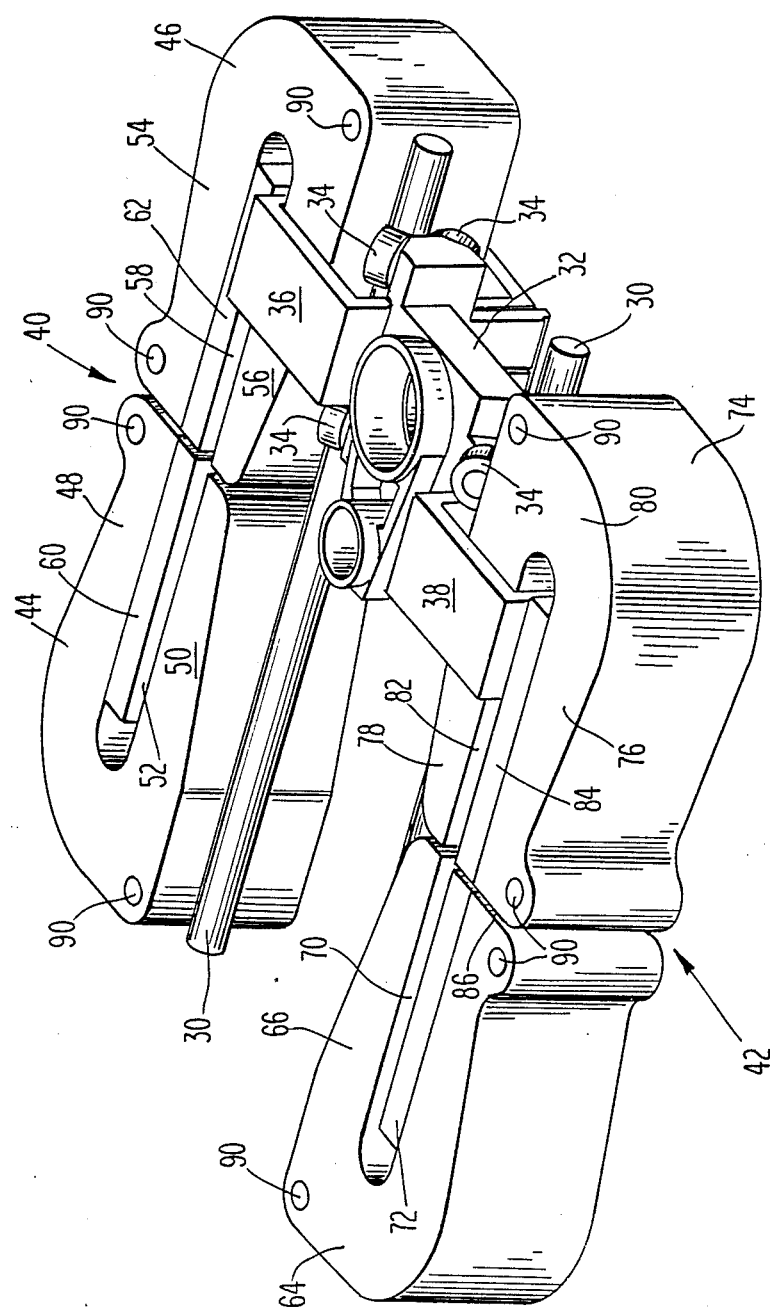
FIG. 3 is an isolated, enlarged perspective view of the magnetic circuit structure shown in FIG. 2.

As shown in FIG. 3, conductors 44 and 46 are oriented so that their open ends are facing, i.e., in communication so that a linear gap is defined as including gap 52 and 58. As carriage 32 is caused to move along rails 30, coil 36 will pass from gap 58 into gap 52.

The magnetic circuit structure contained in magnetic circuit set 42 is identical to that of set 40. However, set 40 can also be described as having a magnetic circuit structure which includes a generally C-shaped and integrally formed flux conductor 64 having poles 66 and 68. A gap 70 is defined between poles 66 and 68. A magnet 72 is attached to pole 68 in gap 70. The flux generated by magnet 72 is directed across gap 70.

Magnetic circuit set 42 is also shown to include flux conductor 74 which can be described as having generally parallel first and second poles 76 and 78. An integrally formed base 80 joins one end of poles 76 and 78 such that conductor 74 defines a continuous flux path. Poles 76 and 78 define a gap 82 therebetween. Magnet 84 is attached to pole 76 in gap 82 so that flux generated by magnet 84 is directed across gap 82. As used in this application, continuous flux path means that there are no breaks or gaps occurring in the flux path. This is achieved in the present invention by the integral formation of conductors 44, 46, 64 and 74.

Similar to set 40, conductors 64 and 74 each have an open end which are positioned so that the respective open ends face one another and define gap 86 therebetween. Gap 86 is sized, i.e., the distance between the ends of magnets 84 and 72, so that there is no interruption in the movement of coil 38 from gap 82 to gap 70. In other words, gap 86 is sized such that there is generally no change in the flux density through which coil 38 passes. It will be noted that a similar gap exists between magnets 60 and 62. The sizing of that gap should be determined in a fashion identical to the sizing of gap 86.

A number of bores 90 are shown to be provided in conductors 44, 46, 64 and 74 so that such conductors can be securely mounted to frame 22 (FIG. 2). Such mounting can be by any suitable means such as screws (not shown).

It is also shown in FIG. 3 that flux conductors 44, 46, 64 and 74 are thickest in the region where flux will be the densest, namely in the base region where the poles of the respective conductors are joined. Consequently, the magnetic circuit structure of the present invention provides a continuous flux path in those regions where the flux density is the greatest maximizing efficiency. In addition, unlike previous devices, during assembly large attractive forces do not exist between the separate pole pieces of flux conductors 44, 46 and 64, 74. Consequently, the structure of magnetic circuit sets 40 and 42 provide for relative ease in assembly of actuator 20 (FIG. 2).

In operation, one wishing to displace carriage 32 in an actuator, would provide the magnetic circuit structures shown in FIGS. 2 and 3 and would pass a current through coils 36 and 38. It will be recognized that the direction of the current through respective coils should be such that the resulting force acting upon the coils is in the same radial direction.

While the invention has been described and illustrated with reference to specific embodiments, those skilled in the art will recognize that modification and variations may be made without departing from the principles of the invention as described herein above and set forth in the following claims.

What is claimed is:

1. Magnetic circuit structure for use in an actuator, said actuator having a displaceable assembly and a coil attached to said assembly, said magnetic circuit comprising:

a first pair of flux conductors, each flux conductor having generally parallel first and second poles defining a first gap therebetween and each having an integrally formed base joining one end of said first and second poles, wherein each of said flux conductors defines a continuous flux path, said first and said second poles being of predetermined thickness, said base of each said flux conductors being of greater thickness than said predetermined thickness of said first and second poles, said flux conductors being arranged such that the free ends of said first and second poles are facing so that the first gaps associated with each of said flux conductors are aligned; and a first pair of magnets, each magnet being attached to one of said first poles in said first gap so that flux generated by each magnet is directed across said first gap, wherein a portion of said coil passes through said first gap.

2. Magnetic circuit structure for use in an actuator, said actuator having a displaceable assembly and a first coil and a second coil attached to said assembly, said magnetic circuit comprising:

a first pair of flux conductors, each flux conductor having generally parallel first and second poles defining a first gap therebetween and each having an integrally formed base joining one end of said first and second poles, wherein each of said flux conductors defines a continuous flux path, said flux conductors being arranged such that the free ends of said first and second poles are facing so that the first gaps associated with each of said flux conductors are aligned;

a first pair of magnets, each magnet being attached to one of said first poles in said first gap so that flux generated by each magnet is directed across said first gap, wherein a portion of said first coil passes through said first gap;

a second pair of flux conductors, each flux conductor having generally parallel first and second poles defining a second gap therebetween and each having an integrally formed base joining one end of said first and second poles, wherein each of said flux conductors defines a continuous flux path, said flux conductors being arranged such that the free ends of said first and second poles are facing so that the second gaps associated with each of said flux conductors are aligned;

a second pair of magnets, each magnet being attached to one of said first poles in said second gap so that flux generated by each magnet is directed across said second gap, wherein a portion of said second coil passes through said second gap;

the pole orientations of said first magnets and said second magnets are such that the flux across said second gaps is in the same direction as the flux across said first gaps; and said flux has a density and wherein the facing ends of said poles of said first and said second pair of flux conductors define a third gap, said third gap sized so that as said first coil and said second coil move away from said third gap in said first and said second gaps there is generally no change in said flux density.

* * * * *